2,924,551
HEAVY METAL-DIAMINE COMPLEX

James Harwood, Western Springs, Richard A. Reck, Chicago, and Walter W. Abramitis, Downers Grove, Ill., assignors to Armour and Company, Chicago, Ill., a corporation of Illinois No Drawing. Application July 13, 1956
Serial No. 597,579

12 Claims. (Cl. 167—22)

This invention in one of its aspects relates to complexes of heavy metal salts and certain diamines. In another of its aspects, the invention relates to fungicidal compositions containing as an essential active ingredient the aforesaid heavy metal complex.

The novel compounds of the present invention comprise the complex of 1 mole of a heavy metal salt and 2 moles of a diamine, said diamine having the formula $R'R'N-(CH_2)_n-NR'R$, wherein R is an aliphatic hydrocarbon radical having from 8 to 20 carbon atoms, $n$ is an integer of from 2 to 5, R' is a radical selected from the group consisting of methyl and hydrogen radicals, and at least one R' is hydrogen.

The complexes of this invention are produced, generally, by forming a solution containing a diamine and adding a solution containing a heavy metal salt. It is an important element of the invention that the reactants be added in such quantities that the ratio of diamine to heavy metal is 2:1. As an illustration, the structure of one class of our novel complexes may be represented as follows:

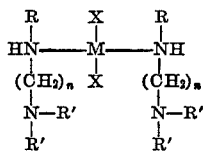

wherein R is an aliphatic hydrocarbon radical having from 8 to 20 carbon atoms, $n$ is an integer of from 2 to 5, R' is a radical selected from the group consisting of methyl and hydrogen radicals, M is a heavy metal, and X is halide. The structural formula for the above may be given as follows:

$$[[RNH-(CH_2)_n-NR'_2]MX_2]^0$$

In connection with the object of obtaining 2:1 complexes of the nature set forth above, we have made the following observations:

(1) The diamine used as a starting material must contain at least one coordinative nitrogen atom. It has been observed that the nitrogen atom in a tertiary amino group is incapable of complexing or forming a coordination compound with heavy metals, and therefore only the nitrogen atoms contained in primary and secondary amino groups can be considered coordinative nitrogens.

(2) It is preferred that the two amino groups contained in the diamine starting material be of a different order or type. More specifically, if one of the amino groups in the diamine is a primary amine, then it is preferred that the other be secondary or tertiary, and so on. If both amino groups are primary, or both are secondary, there is a tendency toward chelation, namely, the complexing of a single molecule of heavy metal with both amino groups of a single diamine molecule, rather than the complexing of one molecule of heavy metal with two molecules of diamine, which latter 2:1 ratio of diamine to heavy metal is characteristic of the compounds contemplated by the present invention.

In the embodiment of the invention involving the use of a diamine containing one primary and one secondary amino group, it is a characteristic of the product that the complex is formed through the secondary amino function rather than the primary. This is explained by the fact that the secondary amino function is somewhat stronger and when two moles of diamine are mixed with a heavy metal compound such as copper chloride, the copper chloride will react preferentially with the stronger secondary amino function, thus:

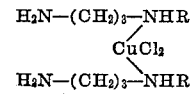

Evidence for the above lies in the fact that secondary amine-copper chloride complexes are a conventional dark blue or purple in color, as contrasted with the light-blue color of primary amine-copper chloride complexes. The compounds made by reacting a 2:1 ratio of N-aliphatic-trimethylenediamine and copper chloride according to the present invention are purple in color.

Any suitable "heavy" metal may be used as a component of the complexes contemplated by the present invention. Such metals are to be found in groups I–B, II–B, VI–B, VII–B, and VIII of the periodic chart of the elements. As specific examples, we may use the salts of heavy metals such as chromium, manganese, iron, cobalt, nickel, copper, zinc, cadmium, tin, and the like. The salts of copper, iron, cadmium, and zinc are preferred. Although we prefer to use halides as the anionic portion of the heavy metal salts, it will be understood that other suitable anions, such as acetate, sulphate, nitrate, and oxalate, may also be used.

Various substituted polymethylenediamines may be employed as starting materials in preparing the complexes of the present invention. In general, we may use any N-aliphatic-polymethylenediamine having (1) at least one coordinative nitrogen atom and (2) amino groups which are not the same. These diamines may be represented structurally as $R'R'N-(CH_2)_n-NR'R$, wherein R is an aliphatic hydrocarbon radical having from 8 to 20 carbon atoms, $n$ is an integer of from 2 to 5, R' is a radical selected from the group consisting of methyl and hydrogen radicals, and at least one R' is hydrogen. Generally, the N-substituted trimethylenediamine compounds are most readily available and to this extent are preferred in the preparation of the complexes of this invention. As representative of suitable N-substituted polymethylenediamine compounds may be mentioned: N-octyl, N-decyl, N-dodecyl, N-dodecenyl, N-tetradecyl, N-tetradecenyl, N-hexadecyl, N-hexadecenyl, N-octadecyl, N-octadecenyl, and N-octadecadienyl.

Mixtures of diamine compounds may also be employed, particularly mixtures of diamines derived from naturally occurring fats and oils, such as soybean oil, coconut oil, tallow, and the like. Examples of preferred diamine mixtures are N-tallow polymethylenediamine (derived from tallow and in which "tallow" comprises a mixture of the following aliphatic radicals: dodecyl, tetrarecyl, tetradecenyl, hexadecyl, hexadecenyl, octadecyl, octadecenyl, octadecadienyl, eicosyl); N-coco polymethylenediamine (derived from coconut oil and in which "coco" comprises a mixture of hexyl, octyl, decyl, dodecyl, tetradecyl, hexadecyl, octadecyl, octadecenyl, and octadecadienyl radicals); and N-soya polymethylenediamine (derived from soybean oil and in which "soya" comprises a mixture of hexadecyl, octadecyl, eicosyl, octadecenyl, octadecadienyl, and octadecatrienyl radicals). Hereinafter, the terms "tallow," "coco," and "soya" are meant to refer to the respective mixtures of radicals set forth.

Also applicable to the present invention, as indicated above, are the polysubstituted N-aliphatic-polymethylenediamines having at least one N-substituted (also referred to herein as amino substituted) methyl group, as for example, N - aliphatic - N - methylpolymethylenediamine, N-aliphatic-N,N'-dimethylpolymethylenediamine, N - aliphatic-N',N'-dimethylpolymethylenediamine, etc.

The reaction may be carried out without special apparatus. It may be conducted in any convenient vessel adapted to contain the reactants. The reaction proceeds spontaneously merely by mixing or contacting the reactants in the presence of moderate heat. To facilitate contact it is desirable to dissolve the reactants in a suitable liquid solvent which is a mutual solvent for the reactants, i.e., a solvent which will dissolve each of the reactants. Preferably the solvent should not enter into, or interfere with, the desired reaction. It is important that the solvent be substantially anhydrous. Generally, solvents having a minor proportion of water are suitable, as, for example, 95% aqueous ethanol. Various low-molecular-weight organic solvents will be suitable for the reaction, in particular the lower alcohols and ketones and the lower homologs of toluene, and the like. Mixtures of such solvents may likewise be employed.

According to the preferred practice, the reaction is favored with a moderate amount of heat, although it is quite satisfactory to conduct the reaction at room temperature. Higher and lower temperatures may be employed, but at relatively high temperatures there is an undesirable tendency toward breakdown of complex formed. It is advisable to agitate and stir the reaction mixture until the reaction is substantially completed.

Following the desired reaction the product may be isolated from the reaction zone by any suitable method. For example, the reaction mixture may be cooled so as to cause precipitation or crystallization of the product and the mixture then filtered or decanted to isolate the product. Also, it will be satisfactory to evaporate the solvent and thereby leave the desired product as a residue.

The heavy metal-diamine complexes described above can be used as the active ingredient in compositions for combating fungal attack. Such compositions can take the form of emulsions, solutions, powders, etc. When used on growing plants, the complexes are not applied in full strength, but instead are combined with an inert carrier so that a fungistatic but non-phytotoxic concentration of the complex can be applied to the growing plants. It has been found that there is a considerable margin of safety between active and phytotoxic concentrations. For example, with most of the compounds falling within the scope of this invention, an effective fungistatic or fungitoxic action is obtained at concentrations ranging from 10 to 100 parts per million, whereas no phytotoxicity is exhibited in concentrations of 1,000 parts per million and higher, and in the hardier plants concentrations as high as 5,000 and 6,000 parts per million produce no phytotoxicity. This permits the fungicidal composi- tions of this invention to be applied to plants without danger of phytotoxicity due to over concentrations. It will be understood that the above concentrations are in terms of solutions or suspensions which are sprayed on plants and that such concentrations are subject to a substantial upward adjustment when used in connection with dry, powdered compositions which are applied by dusting on the plants.

This invention is further illustrated and its value shown by the following specific examples:

EXAMPLE 1

*N-dodecyltrimethylenediamine-cupric chloride complex*

A solution of 13.4 gms. (0.1 mole) of cupric chloride (anhydrous) in 200 ml. of isopropyl alcohol was added with stirring to 48.4 gms. (0.2 mole) of N-dodecyltrimethylenediamine dissolved in 300 ml. of isopropyl alcohol. Upon cooling a purple precipitate formed which was filtered and dried. The purple complex had the formula:

Calculated: N, 9.06; Cl, 11.49; Cu, 10.26. Found: N, 9.09; Cl, 11.0; Cu, 10.1.

EXAMPLE 2

*N-(1-methyldodecyl)-N',N'-dimethyl-1,3-propylene-diamine-cupric chloride complex*

A solution of 13.4 gms. (0.1 mole) of cupric chloride (anhydrous) in 200 ml. of isopropyl alcohol was added with stirring to 56.8 gms. (0.2 mole) of N-(1-methyldodecyl)-N',N'-dimethyl-1,3-propanediamine dissolved in 300 ml. of isopropyl alcohol. Upon cooling, a precipitate formed which was filtered and dried. The complex had the formula:

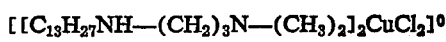

EXAMPLE 3

A solution of 18.2 gms. (0.1 mole) of cypric acetate (anhydrous) in 200 ml. of isopropyl alcohol was added with stirring to 48.4 gms. (0.2 mole) of N-dodecyltrimethylene diamine dissolved in 300 ml. of isopropyl alcohol. Upon cooling, a dark-blue precipitate formed which was filtered and dried.

EXAMPLE 4

The fungicidal activity and the phytotoxicity of the foregoing compounds were tested according to the following procedure:

*Fungicidal activity.*—For this test, the Standard Fungicidal Test of the American Phytopathological Society was employed using the fungi: peach brown rot (*Monilinia fructicola*); apple bitter rot (*Glomerella cingulata*); and tomato early blight (*Alternaria oleracea*). Briefly described, this test involves subjecting the spores of various fungi to graded concentrations of the test compound and determining the extent of spore germination at the end of 24 hours. The calculated percentage of spores not germinated serves as an index of the fungistatic of fungicidal activity of the chemical. A check is kept on the viability of the culture.

*Phytotoxicity tests.*—Young tomato, pepper, and bean plants contained in individual pots are placed on a slowly revolving stand and sprayed from above and below at 45-degree angles to the point of runoff. The materials are prepared as aqueous solutions with a wetting agent, or as emulsions, and applied to the plants by means of an atomizer at 12.5 p.s.i. As the plants are sprayed, they are tagged and returned to an artifically lighted plant table for observation.

*Results.*—The compounds tested, concentrations used, the percentage of spore germination obtained for each organism, and the phytotoxic response levels of tomato, pepper, and bean plants are presented in Table I below:

TABLE I

| Compound | Organism | Percent Spore Germination at conc. in p.p.m. | | | | $LD_{50}$, p.p.m. | Minimal Phytotoxic Dosage in p.p.m. for— | |
|---|---|---|---|---|---|---|---|---|
| | | 100 | 10 | 1.0 | 0.1 | | Tomato | Pepper |
| N-dodecyltrimethylene diamine-cupric chloride complex (Example 1). | A.o. | 0.0 | 0.0 | 36.1 | 84.7 | 0.6 | 2,000 | 2,000 |
| | G.c. | 0.0 | 47.1 | 95.2 | 98.5 | 9.0 | | |
| | M.f. | 0.0 | 0.0 | 16.9 | 92.4 | 0.4 | | |
| N-(1-methyldodecyl)-N',N'-dimethyl-1,3-propanediamine-cupric chloride complex (Example 2). | A.o. | 0.0 | 0.0 | 63.3 | 96.1 | 1.4 | 2,000 | 2,000 |
| | G.c. | 0.0 | 18.4 | 59.7 | 92.2 | 1.6 | | |
| | M.f. | 0.0 | 41.9 | 77.1 | 96.1 | 6.0 | | |
| N-dodecyltrimethylenediamine-cupric acetate complex (Example 3). | A.o. | 0.0 | 64.3 | 94.9 | 98.6 | 14.0 | 2,000 | 2,000 |
| | G.c. | 0.0 | 48.1 | 91.8 | 99.5 | 9.4 | | |
| | M.f. | 0.0 | 0.0 | 84.4 | 99.0 | 2.1 | | |

The term $LD_{50}$ in the foregoing Table I means the lethal does required to kill 50% of the test organisms.

EXAMPLE 5

(A) An emulsifiable concentrate consists of:
50% active chemical
5–10% non-ionic emulsifier such as the coco acid or rosin fatty acid esters of polyethylene glycols
45–50% aromatic or aliphatic solvent such as xylene or acetone This is diluted with water to give 1–2 lbs. active ingredient per 100 gals. water for the final spray.

(B) A wettable powder which may be used in the form of a water spray consists of:
50–75% active chemical
5% non-ionic emulsifier such as the coco fatty acid or rosin fatty acid esters of polyethylene glycols
45–20% inert diluent such as pyrophyllite, clays, celite, etc.

One to two pounds of this powder is placed in 100 gallons of water and sprayed in this form.

(C) A dust concentrate composition consists of:
50–75% active ingredient
50–25% inert diluent such as pyrophyllite, clays, celite, etc.

The average particle size should not be greater than 30 microns. Efficiency appears to increase with the fineness of the dust.

It will be understood that any of the heavy metal-diamine complexes described herein can be used in the specific formulations of this example.

While in the foregoing specification this invention has been described in relation to certain specific embodiments thereof and details have been set forth for the purpose of illustration, it will be apparent to those skilled in the art that the invention is susceptible of other embodiments and many of the details set forth herein can be varied considerably without departing from the basic concept of the invention.

We claim:

1. As a new and useful composition of matter, a complex of 1 mole of a heavy metal salt and 2 moles of a diamine, said diamine having the formula R'R'N—(CH$_2$)$_n$—NR'R wherein R is an aliphatic hydrocarbon radical having from 8 to 20 carbon atoms, n is an integer of from 2 to 5, R' is a radical selected from the group consisting of methyl and hydrogen radicals with the proviso that where R' and R in the radical —NR'R are methyl and alkyl respectively, at least one R' in the radical —NR'R' is hydrogen and where R' in the radical —NR'R is hydrogen, the radical —NR'R' is selected from the group consisting of —NH$_2$ and —N(CH$_3$)$_2$.

2. The composition of matter set forth in claim 1 wherein said heavy metal salt is copper chloride.

3. The composition of matter set forth in claim 1 wherein said diamine is an N-aliphatic-trimethylene-diamine.

4. The composition of matter set forth in claim 1 wherein said diamine is N-dodecyltrimethylenediamine.

5. A compound of the formula

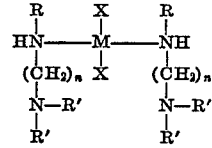

wherein R is an aliphatic hydrocarbon radical having from 8 to 20 carbon atoms, n is an integer of from 2 to 5, R' is a radical selected from the group consisting of methyl and hydrogen radicals with the proviso that where R' and R in the radical —NR'R are methyl and alkyl respectively, at least one R' in the radical —NR'R' is hydrogen and where R' in the radical —NR'R is hydrogen, the radical —NR'R' is selected from the group consisting of —NH$_2$ and —N(CH$_3$)$_2$, M is a heavy metal, and X is halogen.

6. A compound of the formula

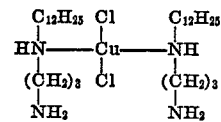

7. A fungicidal composition comprising a carrier and an effective concentration of a complex of 1 mole of a heavy metal salt and 2 moles of a diamine, said diamine having the formula R'R'N—(CH$_2$)$_n$—NR'R, wherein R is an aliphatic hydrocarbon radical having from 8 to 20 carbon atoms, n is an integer of from 2 to 5, R' is a radical selected from the group consisting of methyl and hydrogen radicals with the proviso that where R' and R in the radical —NR'R are methyl and alkyl respectively, at least one R' in the radical —NR'R' is hydrogen and where R' in the radical —NR'R is hydrogen, the radical —NR'R' is selected from the group consisting of —NH$_2$ and —N(CH$_3$)$_2$.

8. The fungicidal composition set forth in claim 7 wherein said heavy metal halide is copper chloride.

9. The fungicidal composition set forth in claim 7 wherein said diamine is an N-aliphatic-trimethylenediamine.

10. The fungicidal composition set forth in claim 7 wherein said diamine is N-dodecyltrimethylenediamine.

11. A fungicidal composition comprising a carrier and an effective concentration of a compound of the formula

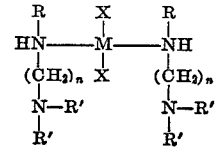

wherein R is an aliphatic hydrocarbon radical having from 8 to 20 carbon atoms, $n$ is an integer of from 2 to 5, R' is a radical selected from the group consisting of methyl and hydrogen radicals, M is a heavy metal, and X is halogen.

12. A fungicidal composition comprising a carrier and an effective concentration of a compound of the formula

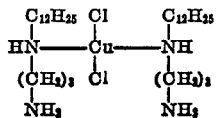

References Cited in the file of this patent

UNITED STATES PATENTS 2,686,798   Gmitter _____ Aug. 17, 1954

OTHER REFERENCES

Grossman et al.: Zeitschrift für Anorganische Chemie, Band 50, pp. 1–18.